United States Patent
Rivolta et al.

(10) Patent No.: US 10,901,529 B2
(45) Date of Patent: Jan. 26, 2021

(54) DOUBLE-TAP EVENT DETECTION DEVICE, SYSTEM AND METHOD

(71) Applicants: STMICROELECTRONICS S.r.l., Agrate Brianza (IT); STMICROELECTRONICS, INC., Coppell, TX (US)

(72) Inventors: Stefano Paolo Rivolta, Desio (IT); Mahaveer Jain, Santa Clara, CA (US); Ashish Bhargava, San Jose, CA (US)

(73) Assignees: STMICROELECTRONICS S.r.l., Agrate Brianza (IT); STMICROELECTRONICS, INC., Coppell, TX (US)

( * ) Notice: Subject to any disclaimer, the term of this patent is extended or adjusted under 35 U.S.C. 154(b) by 0 days.

(21) Appl. No.: 16/040,331

(22) Filed: Jul. 19, 2018

(65) Prior Publication Data
US 2020/0026365 A1    Jan. 23, 2020

(51) Int. Cl.
    *G06F 3/0346* (2013.01)
    *G06F 3/0487* (2013.01)

(52) U.S. Cl.
    CPC .......... *G06F 3/0346* (2013.01); *G06F 3/0487* (2013.01)

(58) Field of Classification Search
    CPC .............................. G06F 3/0346; G06F 3/0487
    See application file for complete search history.

(56) References Cited

U.S. PATENT DOCUMENTS

| | | | | |
|---|---|---|---|---|
| 5,943,043 A * | 8/1999 | Furuhata | ................ | G06F 3/045 345/173 |
| 8,482,520 B2 * | 7/2013 | Orr | ..................... | G06F 3/04886 345/156 |
| 8,786,561 B2 * | 7/2014 | Stoumbos | ............. | G06F 3/0488 345/173 |
| 8,904,410 B2 * | 12/2014 | Kelly | ...................... | G06F 9/542 719/313 |
| 8,949,731 B1 * | 2/2015 | Shi | ...................... | G06F 3/04883 715/773 |
| 9,423,871 B2 * | 8/2016 | Sukumar | ................. | G06F 3/013 |
| 9,696,859 B1 * | 7/2017 | Heller | ..................... | G06F 3/012 |
| 10,282,024 B2 * | 5/2019 | Harrison | ............... | G06F 3/0416 |
| 10,339,740 B2 * | 7/2019 | Berezin | ............. | G07C 9/00896 |
| 10,599,251 B2 * | 3/2020 | Schwarz | ............... | G06F 3/0416 |

(Continued)

OTHER PUBLICATIONS

Belgioioso et al., "A Machine Learning based Approach for Gesture Recognition from Inertial Measurements," 53$^{rd}$ *IEEE Conference on Decision and Control*, Los Angeles, California, USA, Dec. 15-17, 2014, pp. 4899-4904. (9 pages).

(Continued)

*Primary Examiner* — Grant Sitta
(74) *Attorney, Agent, or Firm* — Seed IP Law Group LLP

(57) ABSTRACT

Digital signal processing circuitry, in operation, determines, based on accelerometer data, a carry-position of a device. Double-tap detection parameters are set using the determined carry-position. Double-taps are detected using the set double-tap detection parameters. In response to detection of a double-tap, control signals, such as a flag or an interrupt signal, are generated and used to control operation of the device. For example, a device may enter a wake mode of operation in response to detection of a double-tap.

31 Claims, 5 Drawing Sheets

(56) References Cited

U.S. PATENT DOCUMENTS

| | | | | |
|---|---|---|---|---|
| 2003/0217873 | A1* | 11/2003 | Paradiso | G06F 3/0433 178/18.04 |
| 2005/0179646 | A1* | 8/2005 | Lin | G06F 3/0416 345/156 |
| 2005/0219213 | A1* | 10/2005 | Cho | G06F 3/0346 345/158 |
| 2005/0246109 | A1* | 11/2005 | Bang | G01P 15/18 702/41 |
| 2006/0259205 | A1* | 11/2006 | Krum | G06F 3/014 701/1 |
| 2007/0151772 | A1* | 7/2007 | Wu | G06F 3/0346 177/25.14 |
| 2007/0152984 | A1* | 7/2007 | Ording | G06F 3/04845 345/173 |
| 2009/0033807 | A1* | 2/2009 | Sheng | H04N 5/4403 348/734 |
| 2009/0315826 | A1* | 12/2009 | Lin | G06F 3/04883 345/157 |
| 2010/0060604 | A1* | 3/2010 | Zwart | G06F 1/1684 345/173 |
| 2010/0090971 | A1* | 4/2010 | Choi | G06F 3/0482 345/173 |
| 2010/0192662 | A1* | 8/2010 | Yanni | G01P 21/00 73/1.38 |
| 2010/0256947 | A1 | 10/2010 | Kim et al. | |
| 2011/0087454 | A1* | 4/2011 | Lee | G06F 3/017 702/124 |
| 2011/0221777 | A1* | 9/2011 | Ke | G06F 3/038 345/649 |
| 2012/0158629 | A1* | 6/2012 | Hinckley | G06F 3/0418 706/15 |
| 2012/0200497 | A1* | 8/2012 | Nasiri | G06F 3/017 345/157 |
| 2012/0265482 | A1* | 10/2012 | Grokop | G06F 1/1686 702/141 |
| 2013/0046505 | A1* | 2/2013 | Brunner | G01C 22/006 702/141 |
| 2013/0179110 | A1* | 7/2013 | Lee | A61B 5/1123 702/130 |
| 2013/0257788 | A1* | 10/2013 | Bakshi | G06F 3/0487 345/174 |
| 2013/0335333 | A1* | 12/2013 | Kukulski | G06F 3/04845 345/173 |
| 2013/0342469 | A1* | 12/2013 | Keeney | G06F 3/0416 345/173 |
| 2014/0032880 | A1* | 1/2014 | Ka | G06F 9/3885 712/30 |
| 2014/0300559 | A1* | 10/2014 | Tanimoto | G06F 3/0416 345/173 |
| 2015/0050923 | A1* | 2/2015 | Tu | H04W 4/029 455/418 |
| 2015/0186004 | A1* | 7/2015 | Gordon | G01C 21/367 345/173 |
| 2015/0186026 | A1* | 7/2015 | Gordon | G06F 3/04883 345/173 |
| 2015/0242036 | A1* | 8/2015 | Heidari | G06F 1/1684 345/173 |
| 2015/0272480 | A1* | 10/2015 | Senta | A61B 5/725 600/595 |
| 2015/0316577 | A1* | 11/2015 | Pakzad | G01B 7/003 702/150 |
| 2015/0346834 | A1* | 12/2015 | Martinez Fernandez | G06F 3/017 340/12.5 |
| 2016/0026261 | A1 | 1/2016 | Cheng et al. | |
| 2016/0077581 | A1* | 3/2016 | Shi | G06F 3/011 340/12.5 |
| 2016/0077650 | A1* | 3/2016 | Durojaiye | G06F 3/0488 345/173 |
| 2016/0085324 | A1* | 3/2016 | Schwarz | G06F 3/0416 345/173 |
| 2016/0378286 | A1* | 12/2016 | Ke | G06F 3/04886 715/764 |
| 2017/0308182 | A1* | 10/2017 | Belverato | G06F 3/0346 |
| 2018/0067638 | A1* | 3/2018 | Klein | G06F 1/1652 |
| 2018/0095654 | A1* | 4/2018 | Reisen | G06F 3/0482 |
| 2019/0034001 | A1* | 1/2019 | Tanabe | G06F 21/31 |
| 2019/0095093 | A1* | 3/2019 | Hori | G06F 3/04883 |
| 2020/0081559 | A1* | 3/2020 | Unnikrishnan | G06F 3/0346 |

OTHER PUBLICATIONS

Benalcázar et al., "Hand Gesture Recognition Using Machine Learning and the Myo Armband," 25th European Signal Processing Conference (EUSIPCO), Kos, Greece, Aug. 28-Sep. 2, 2017, pp. 1075-1079.

Fujinami et al., "Recognizing a Mobile Phone's Storing Position as a Context of a Device and a User," 9th International Conference on Mobile and Ubiquitous Systems: Computing, Networking, and Services (MobiQuitous), Beijing, China, Dec. 12-14, 2012, pp. 76-88. (12 pages).

Ge et al., "Detecting Falls Using Accelerometers by Adaptive Thresholds in Mobile Devices," Journal of Computers 9(7):1553-1559, 2014.

Incel, "Analysis of Movement, Orientation and Rotation-Based Sensing for Phone Placement Recognition," Sensors 15(10):25474-25506, 2015.

Kannan et al., "Momentum: A Deep Learning Approach to Micro-Gesture Recognition and Classification," final project paper, Stanford University, California, USA, 2017, 3 pages.

Mannini et al., "Machine Learning Methods for Classifying Human Physical Activity from On-Body Accelerometers," Sensors 10(2):1154-1175, 2010.

Miluzzo et al., "Pocket, Bag, Hand, etc.—Automatically Detecting Phone Context through Discovery," Proceedings of PhoneSense, Zurich, Switzerland, Nov. 2, 2010, pp. 21-25.

Sztyler et al., "Position-aware activity recognition with wearable devices," Pervasive and Mobile Computing 38(Part 2):281-295, 2017.

Weir et al., "A User-Specific Machine Learning Approach for Improving Touch Accuracy on Mobile Devices," Proceedings of the 25th Annual ACM Symposium on User Interface Software and Tech., Cambridge, Massachusetts, USA, Oct. 7-10, 2012, pp. 465-475.

* cited by examiner

DOUBLE-TAP EVENT DETECTION DEVICE, SYSTEM AND METHOD

BACKGROUND

Technical Field

The present disclosure generally relates to electronic devices and, more specifically, to electronic devices employing double-tap detection mechanisms to control operation of the device.

Description of the Related Art

A double-tap is a gesture commonly used for user interaction in mobile devices, such as phones, tablets, and wearable devices such as smartwatches. Conventionally, resistive/capacitive touch displays or accelerometers have been used to detect double-taps.

In response to the detection of a double-tap, control signals are generated to control operation of the device. For example, in response to the detection of a double-tap, the device may generate control signals to change a wake state of the device, to modify a display, to execute a command, etc.

BRIEF SUMMARY

In an embodiment, a device comprises: digital signal processing circuitry, which, in operation, determines a device-carry-position of a plurality of device-carry positions based on accelerometer data; sets one or more double-tap detection parameters based on the determined device-carry-position; detects double-taps based on double-tap detection logic, wherein the double-tap detection logic uses at least one of the set double-tap detection parameters; and generates a control signal in response to detection of a double tap; and an interface coupled to the digital signal processing circuitry, which, in operation, transmits the control signal. In an embodiment, the device comprises: an accelerometer, which, in operation, generates the accelerometer data. In an embodiment, the accelerometer is a three-axis accelerometer which, in operation, outputs an acceleration signal of each axis. In an embodiment, the device comprises: a high-pass filter, which, in operation, filters the accelerometer data. In an embodiment, the double-tap detection logic uses the filtered accelerometer data. In an embodiment, the one or more double-tap detection parameters comprise one or more threshold magnitudes. In an embodiment, the double-tap detection logic compares accelerometer data to the one or more threshold magnitudes. In an embodiment, the one or more double-tap detection parameters comprise one or more magnitude ranges. In an embodiment, the one or more double-tap detection parameters comprise one or more window sizes. In an embodiment, the control signal comprises a flag. In an embodiment, the control signal comprises an interrupt. In an embodiment, the double-tap detection logic is fixed. In an embodiment, the plurality of device-carry-positions include a first position indicating resting on a hard surface and a second position indicating hand-held.

In an embodiment, a system comprises: one or more processing cores, which in operation, process digital data; and a sensor, communicatively coupled to the one or more processing cores, the sensor including: an accelerometer, which, in operation, generates accelerometer data; and digital signal processing circuitry communicatively coupled to the accelerometer, wherein the digital signal processing circuitry, in operation: determines a device-carry-position of a plurality of device-carry-positions based on the accelerometer data; sets one or more double-tap detection parameters based on the determined device-carry-position; detects double-taps based on double-tap detection logic, wherein the double-tap detection logic uses at least one of the set double-tap detection parameters; and generates a control signal in response to detection of a double tap. In an embodiment, the accelerometer is a three-axis accelerometer which, in operation, outputs an acceleration signal of each axis. In an embodiment, the digital signal processing circuitry comprises a high-pass filter. In an embodiment, the control signal is an interrupt signal and the one or more processing cores, in operation, respond to the interrupt signal by initiating execution of an application. In an embodiment, the one or more double-tap detection parameters comprise one or more threshold magnitudes. In an embodiment, the double-tap detection logic compares accelerometer data to the one or more threshold magnitudes. In an embodiment, the one or more double-tap detection parameters comprise one or more window sizes. In an embodiment, the plurality of device-carry-positions include a first position indicating resting on a hard surface and a second position indicating hand-held.

In an embodiment, a method comprises: determining, using digital signal processing circuitry, a device-carry-position of a plurality of device-carry-positions based on accelerometer data; setting, using the digital signal processing circuitry, one or more double-tap detection parameters based on the determined device-carry-position; detecting, using the digital signal processing circuitry, double-taps based on double-tap detection logic, wherein the double-tap detection logic uses at least one of the set double-tap detection parameters; and generating, using the digital signal processing circuitry, a control signal in response to detection of a double tap. In an embodiment, the one or more double-tap detection parameters comprise one or more threshold magnitudes. In an embodiment, the double-tap detection logic compares accelerometer data to the one or more threshold magnitudes.

In an embodiment, a non-transitory computer-readable medium has contents which cause digital signal processing circuitry to perform a method, the method comprising: determining a device-carry-position of a plurality of device-carry-positions based on accelerometer data; setting one or more double-tap detection parameters based on the determined device-carry-position; executing a detecting double-tap detection routine, wherein the double-tap detection routine uses at least one of the set double-tap detection parameters; and generating a control signal in response to detection of a double tap. In an embodiment, the contents comprise instruction which, when executed by the digital signal processing circuitry, cause the digital signal processing circuitry to perform the method. In an embodiment, the one or more double-tap detection parameters comprise one or more threshold magnitudes which are different for different determined positions.

DETAILED DESCRIPTION

Figure 1:
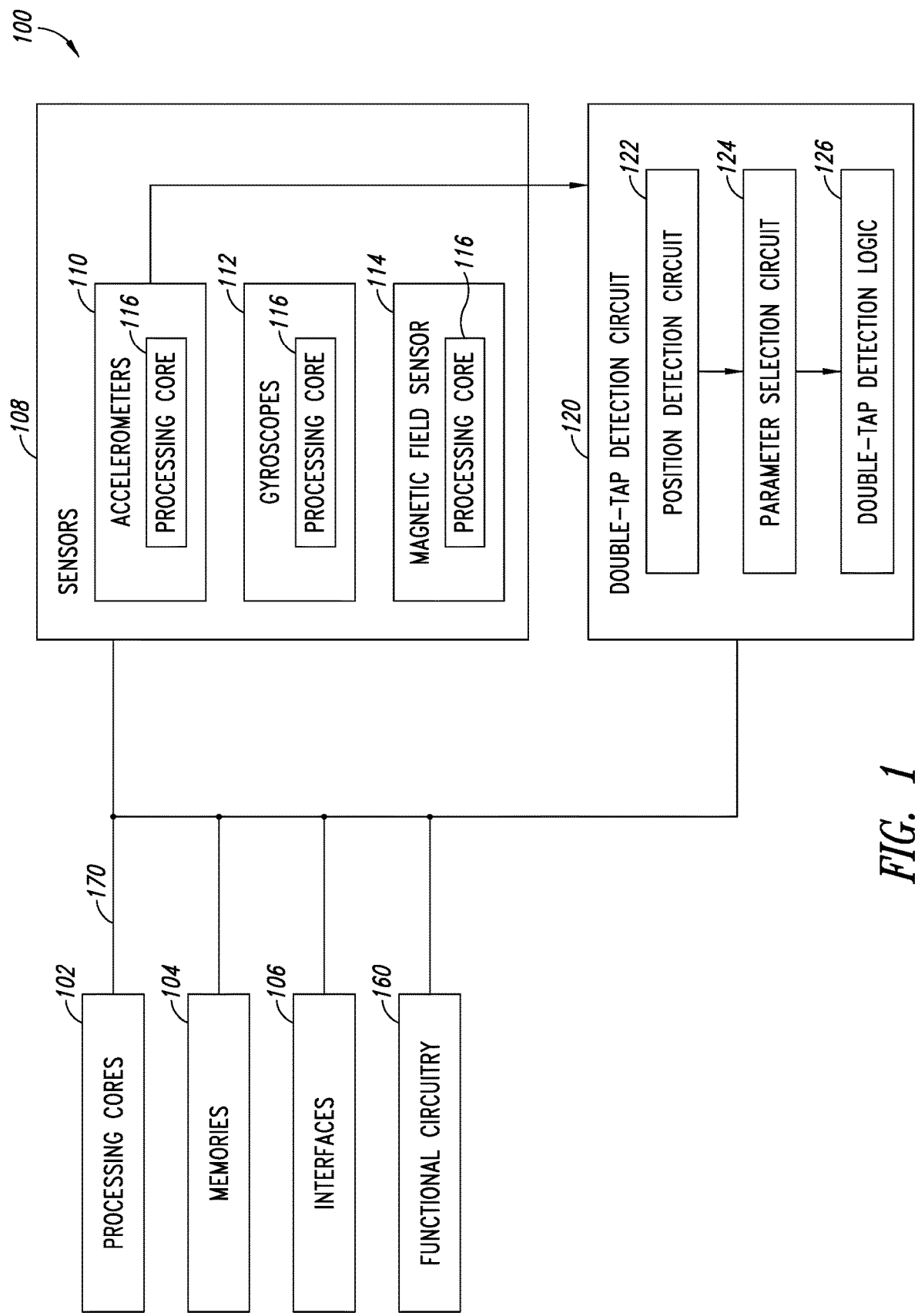
FIG. 1 is a functional block diagram of an embodiment of an electronic device or system.

In the following description, certain details are set forth in order to provide a thorough understanding of various embodiments of devices, systems, methods and articles. However, one of skill in the art will understand that other embodiments may be practiced without these details. In other instances, well-known structures and methods associated with, for example, circuits, such as transistors, multipliers, adders, dividers, comparators, integrated circuits, logic gates, finite state machines, accelerometers, gyroscopes, magnetic field sensors, memories, bus systems, etc., have not been shown or described in detail in some figures to avoid unnecessarily obscuring descriptions of the embodiments.

Unless the context requires otherwise, throughout the specification and claims which follow, the word "comprise" and variations thereof, such as "comprising," and "comprises," are to be construed in an open, inclusive sense, that is, as "including, but not limited to."

Reference throughout this specification to "one embodiment," or "an embodiment" means that a particular feature, structure or characteristic described in connection with the embodiment is included in at least one embodiment. Thus, the appearances of the phrases "in one embodiment," or "in an embodiment" in various places throughout this specification are not necessarily referring to the same embodiment, or to all embodiments. Furthermore, the particular features, structures, or characteristics may be combined in any suitable manner in one or more embodiments to obtain further embodiments.

The headings are provided for convenience only, and do not interpret the scope or meaning of this disclosure.

The sizes and relative positions of elements in the drawings are not necessarily drawn to scale. For example, the shapes of various elements and angles are not drawn to scale, and some of these elements are enlarged and positioned to improve drawing legibility. Further, the particular shapes of the elements as drawn are not necessarily intended to convey any information regarding the actual shape of particular elements, and have been selected solely for ease of recognition in the drawings.

Conventionally, a processing core of an electronic device receives data from user interfaces and sensors and detects user input, such as a double-tap, based on the received data using a software algorithm or routine, or wired logic. A user may double-tap a device to indicate a desire to wake up the device, to put the device to sleep, to expand or shrink an image on a display of the device, etc. The desired response may be based on a context in which the double-tap in received (e.g., when a double-tap is received with the device in a sleep state, the double-tap is treated as a wake-up command). In response to the detection of a double-tap, control signals are generated to cause the device to perform a desired action, e.g., to transition from a sleep-state to a wake up state of operation, etc.

A double-tap mechanism ideally should detect double-taps when a device is being used in various operating conditions, e.g., on a hard surface or held in a user's hand, with a high degree of accuracy of detection (e.g., a rate of detection of double taps >95%), a low false positive rate (e.g., <5%), and with low power consumption. Conventionally, resistive/capacitive touch displays have been used to detect double-taps. Conventional approaches using touch displays generally have a high degree of accuracy of detection and a low false positive rate, but the screen must always be on, which leads to high power consumption (e.g., tens to hundreds of milliamps).

Conventional accelerometer approaches to detecting double taps generally have low power consumption as compared to touch displays, but the detection rate is too low and the false positive rate is too high. Some conventional approaches also envision the acquisition of large amounts of data and machine learning to detect double taps, which may impose significant memory and processing capability requirements.

FIG. 1 is a functional block diagram of an embodiment of an electronic device or system 100 of the type to which the embodiments which will be described may apply. The system 100 comprises one or more processing cores or circuits 102. The processing core 102 may comprise, for example, one or more processors, a state machine, a microprocessor, a programmable logic circuit, discrete circuitry, logic gates, registers, etc., and various combinations thereof. The processing core may control overall operation of the system 100, execution of application programs by the system 100, etc. The system 100 includes one or more memories 104, such as one or more volatile and/or non-volatile memories which may store, for example, all or part of instructions and data related to applications and operations performed by the system 100. The system includes one or more interfaces 106, such as a touchscreen, one or more ports, buttons, etc., and various combinations thereof. As illustrated, the system 100 includes one or more other functional circuits 160, which may include transceivers, antennas, power supplies, etc., and a bus system 170, which may include one or more data, address, power and/or control buses coupled to the various components of the system 100.

The system 100 also includes one or more sensing circuits or sensors 108, which, in operation, sense one or more conditions of device with respect to an environment of the sensors 108, such as one or more accelerometers 110, one or more gyroscopes 112, one or more magnetic field sensors 114, etc. The sensors 108 may be implemented using MEMS or other technology, and as illustrated include one or more embedded processing cores 116.

The system 100 includes a double-tap detection circuit or block 120, which as illustrated includes a position detection circuit or block 122, parameter selection logic or circuitry 124, and double-tap detection logic or circuitry 126. The double-tap detection circuit 120 may also include various other components, such as an internal bus system (not shown), one or more processing cores (see processing core 102), one or more finite state machines (see FIG. 2), one or more filters (see FIG. 2), one or more internal sensors (see FIG. 2) one or more memories (see memory 104), one or more interfaces (see interface 106) power circuitry (not shown), etc.

In operation, the position detection circuit 122 determines a carry or use position of the system 100. For example, the position detection circuit 122 determines whether the system 100 is resting on a hard surface such as a table, on a soft surface such as a bed or couch, is being held in a user's hand, etc., based on data generated by the one or more sensors 108. For example, accelerometer signals indicating little or no relative movement of the device (e.g., signals of less than a first threshold for a threshold period of time) may indicate the device is resting on a hard surface. Accelerometer signals indicating a slightly higher amount of movement of the device (e.g., signals above a second threshold and below a third threshold for a threshold period of time) may indicate the device is resting on a soft surface, such as a bed. Accelerometer signals indicating a higher amount of movement of the device (e.g., signals above a fourth threshold and below a fifth threshold for a threshold period of time) may indicate the device is in a hand-held position. In some embodiments, the position detection circuit may determine additional position information, such as whether the system is moving (e.g., traveling in a car), etc. In some embodiments, the position detection circuit may use machine learning techniques, look-up tables, fuzzy-logic, etc., to detect the carry position of the device.

The parameter selection logic 124, in operation, selects, sets or adjusts parameters of double-tap detection logic or a double-tap detection routine based on the detected carry position. For example, one or more threshold magnitudes, magnitude ranges, number of thresholds, threshold periods of time, filter parameters, etc., may be set based on the detected carry position of the device. The double-tap detection logic 126, in operation, uses the parameters of detection to detect occurrences of a double-tap. The double-tap detection logic 126 may employ common logic or algorithms for the various positions (e.g., the same logic or algorithm may be employed for a plurality of positions, but threshold parameters used are different), different logic or algorithms for the various positions, or various combinations thereof (e.g., one algorithm when the system 100 is resting on a soft or a hard surface (possible with different thresholds) and another algorithm when the system 100 is being held in a user's hand). When a double-tap is detected by the double-tab detection logic 126, appropriate action may be taken by the system 100 in response (e.g., control signals are generated to turn a screen on, zoom, etc.).

In some embodiments, machine learning techniques may be employed by the double-tap detection circuit 120. For example, the position detection circuit 122 may modify a position detection algorithm and/or adjust the parameter settings in real time as the system 100 learns using machine learning techniques to detect the position and set the parameters to obtain better results. Additional positions may be detected (e.g., detection of various types of surface, such as a hard surface or a soft surface) or added to the position detection algorithm based on the machine learning.

In some embodiments, the system 100 may include more components than illustrated, may include fewer components than illustrated, may split illustrated components into separate components, may combine illustrated components, etc., and various combinations thereof. For example, the sensors 108 may omit the gyroscope 112 and the magnetic field sensor 114 in some embodiments, may combine the accelerometer 110 and the gyroscope 112 in some embodiments, etc. In some embodiments, the sensors 108 and the double-tap detection circuit 120 may be combined, etc. For example, the double-tap detection circuit may be implemented using a processing core imbedded in an accelerometer, such as the processing core 116 of accelerometer 110.

Figure 2:
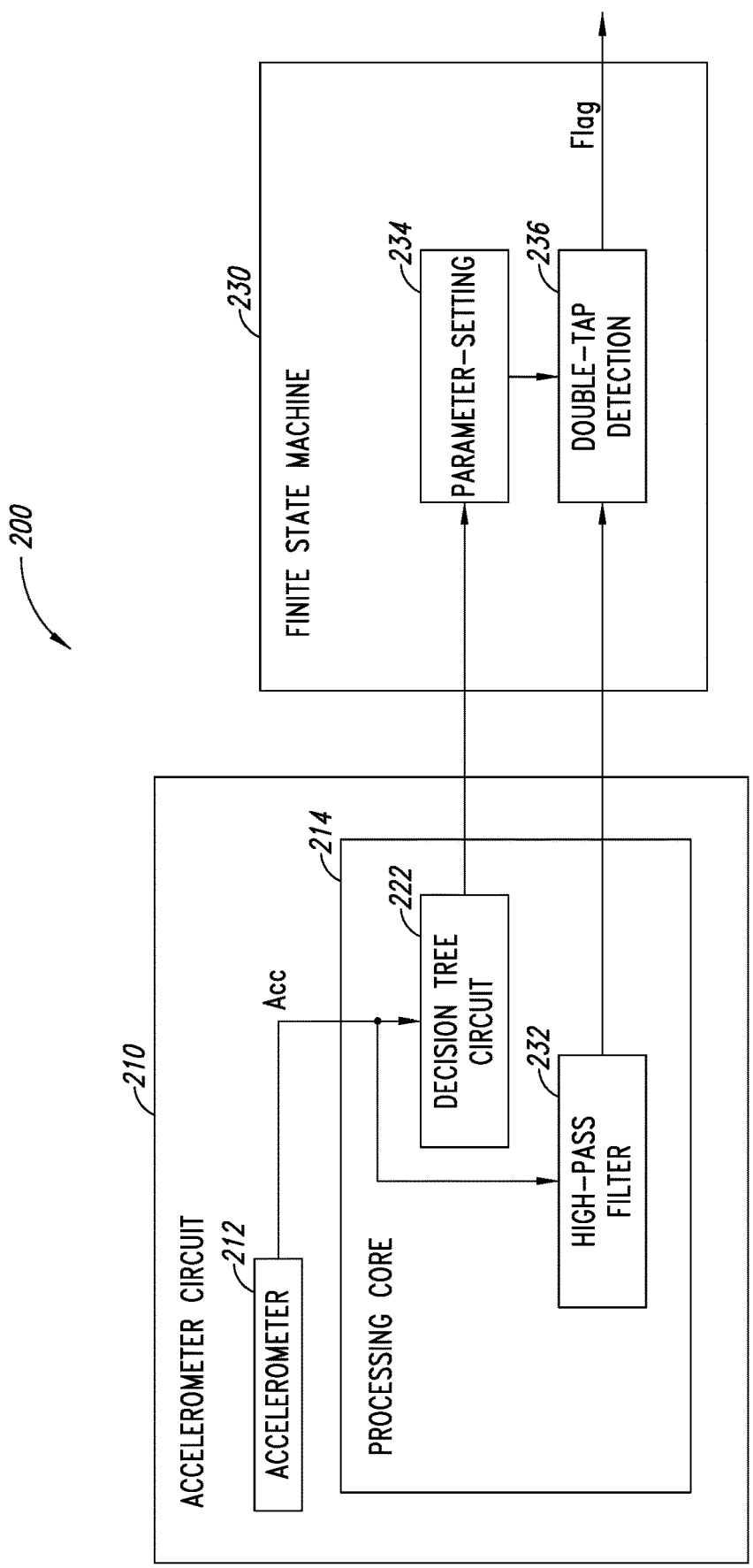
FIG. 2 is a functional block diagram of an embodiment of a double-tap detection circuit.

FIG. 2 illustrates an embodiment of a double-tap detection circuit 200, which may be employed, for example, in the system 100 of FIG. 1. As illustrated, the double-tap detection circuit 200 includes an accelerometer circuit 210. The accelerometer circuit 210 includes an accelerometer 212, which, in operation, generates one or more signals indicative of an acceleration with respect to one or more axis of movement. The accelerometer 212 may be, for example, a three-axis accelerometer, which provides three accelerometer signals in output (e.g., ax, ay, az, according to axis x, y and z respectively). The accelerometer 212, in operation, provides accelerometer signals to position detection logic or a decision tree circuit 222 and to a high-pass filter 232. The position detection logic 222, in operation, determines a carry position of a device, such as the system 100 of FIG. 1, for example, as discussed above with respect to position detection circuit 122 if FIG. 1. The carry position of the device may be selected from a plurality of carry positions. The high-pass filter 232, in operation, filters the accelerometer signals output by the accelerometer 212. In some embodiments, the position detection logic 222 may receive filtered accelerometer signals from the high-pass filter 232 in addition to or instead of accelerometer signals from the accelerometer 212.

The double-tap detection circuit 200 includes a finite state machine (FSM) or control circuit 230, which, in operation, controls the processing of data and control signals provided to and received from other components of the double-tap detection circuit 200, or other components of a system employing the double-tap detection circuit 200 (e.g., the system 100 of FIG. 1). For example, in operation, the double-tap detection circuit 200 may set a flag or generate an interrupt signal to indicate detection of a double-tap. The FSM 230 comprises a parameter setting state or logic 234 and a detection state or logic 236. The parameter setting circuit 234 receives a signal indicative of a carry position of the device generated by the decision tree circuit 222 and sets double-tap detection parameters, such as one or more magnitude thresholds, one or more threshold periods of time, etc., such as discussed above with respect to parameter detection circuit 124 of FIG. 1. The double-tap detection logic 236 receives the filtered accelerometer signals output by high-pass filter 232 and the parameters set by the parameter setting circuit 234 and detects double taps based on the filtered accelerometer signals and the parameters set by the parameter setting circuit 234. As illustrated, the double-tap detection logic 236 sets a flag Flag in response to detection of a double-tap.

In some embodiments, the circuit 200 may include more components than illustrated, may include fewer components than illustrated, may split illustrated components into separate components, may combine illustrated components, etc., and various combinations thereof. For example, the accelerometer circuit 210 may include the FSM 230.

Figure 3:
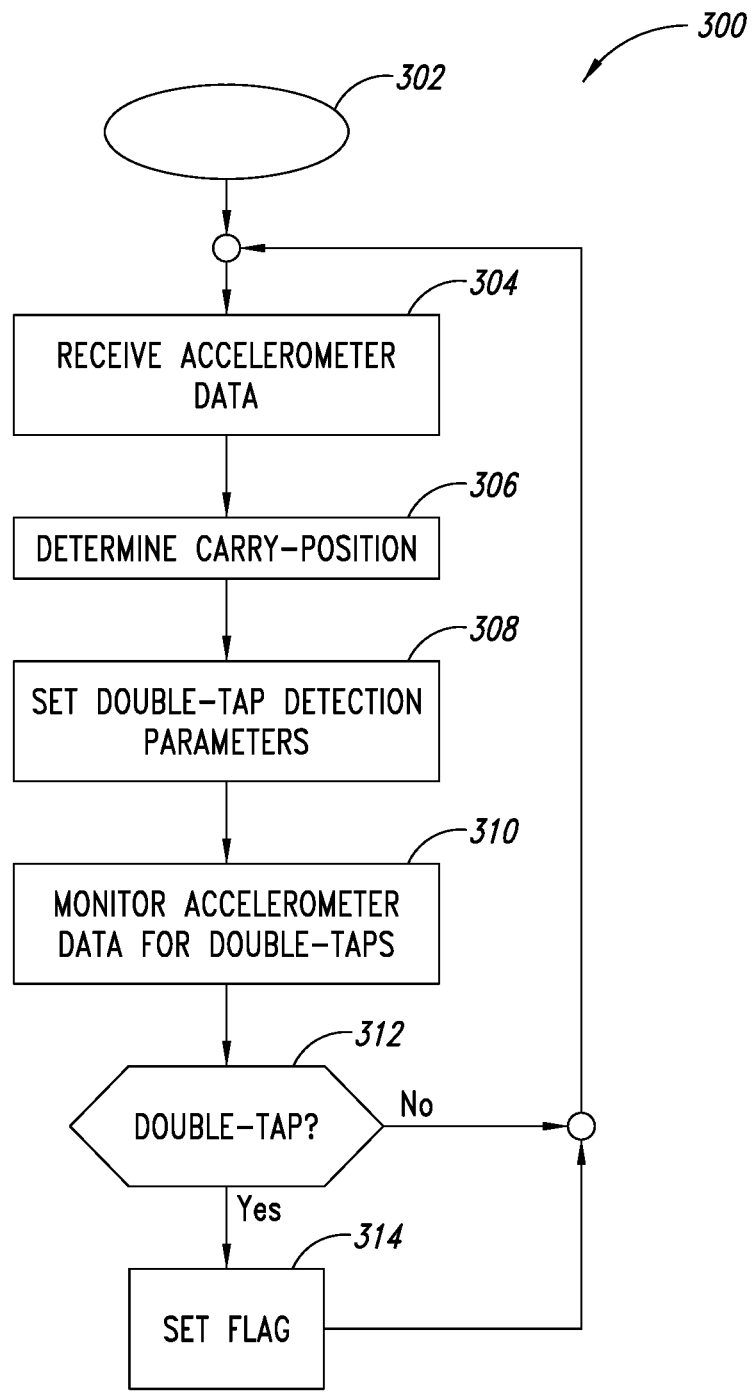
FIG. 3 illustrates an embodiment of a method of detecting a double-tap.

FIG. 3 illustrates an embodiment of a method 300 of detecting a double tap, and for convenience will be described with respect to the embodiment of the system 100 of FIG. 1 and the embodiment of the circuit 200 of FIG. 2. Other systems and circuits may be employed to perform embodiments of the method 300 of FIG. 3.

The method 300 starts at 302. The method 300 may be initiated by an application executing on an application processor (see processing core 102 of FIG. 1). For example, when a device is powered up, a user-interface application may initiate execution of the method 300. In another example, the method 300 may be initiated when a sensor (such as the sensor 108 of FIG. 1 or the accelerometer circuit 212 of FIG. 2) is powered on. The method 300 proceeds from 302 to 304.

At 304, the method 300 receives or samples accelerometer data. For example, the accelerometer circuit 110 of FIG. 1 may provide accelerometer data, e.g., ax, ay, az to the double-tap detection circuit 120 of FIG. 1, or the accelerometer 212 of FIG. 2 may provide accelerometer data, e.g., ax, ay, az to the decision tree circuit 222 and the high-pass filter 232 of FIG. 2. The method 300 proceeds from 304 to 306.

At 306, the method 300 determines a carry position of a plurality of carrier positions based on the received accelerometer data. This may be done, for example, as discussed above with respect to the position detection circuit 122 of FIG. 1 or with respect to the decision tree circuit 222 of FIG. 2. The method proceeds from 306 to 308.

At 308, the method 300 sets double-tap detection parameters based on the carry position determined at 306. The detection parameters may include, for example, one or more magnitude thresholds, one or more period-of-time (e.g., window) thresholds, etc., as discussed above with respect to parameter selection circuit 122 of FIG. 1 and the parameter setting circuit 234 of FIG. 2.

Figure 4:
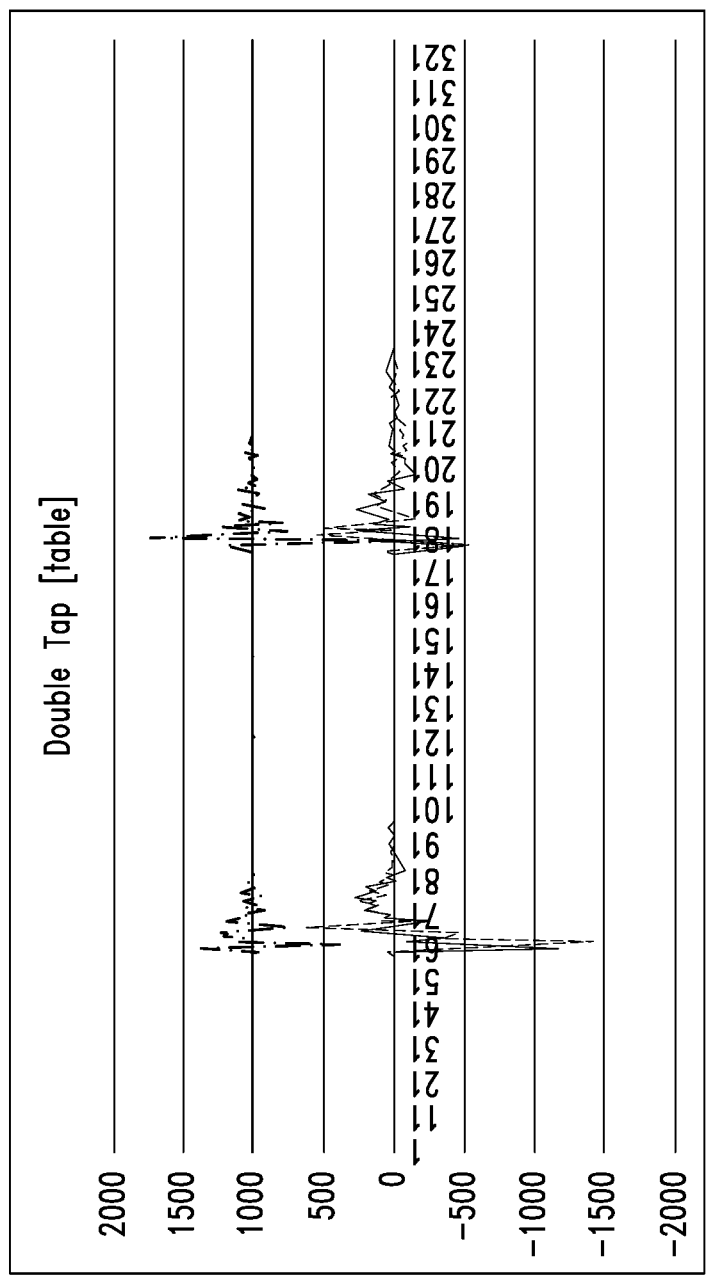
FIG. 4 illustrates an example of accelerometer data associated with a double-tap of a device in a resting position on a hard surface.
Figure 5:
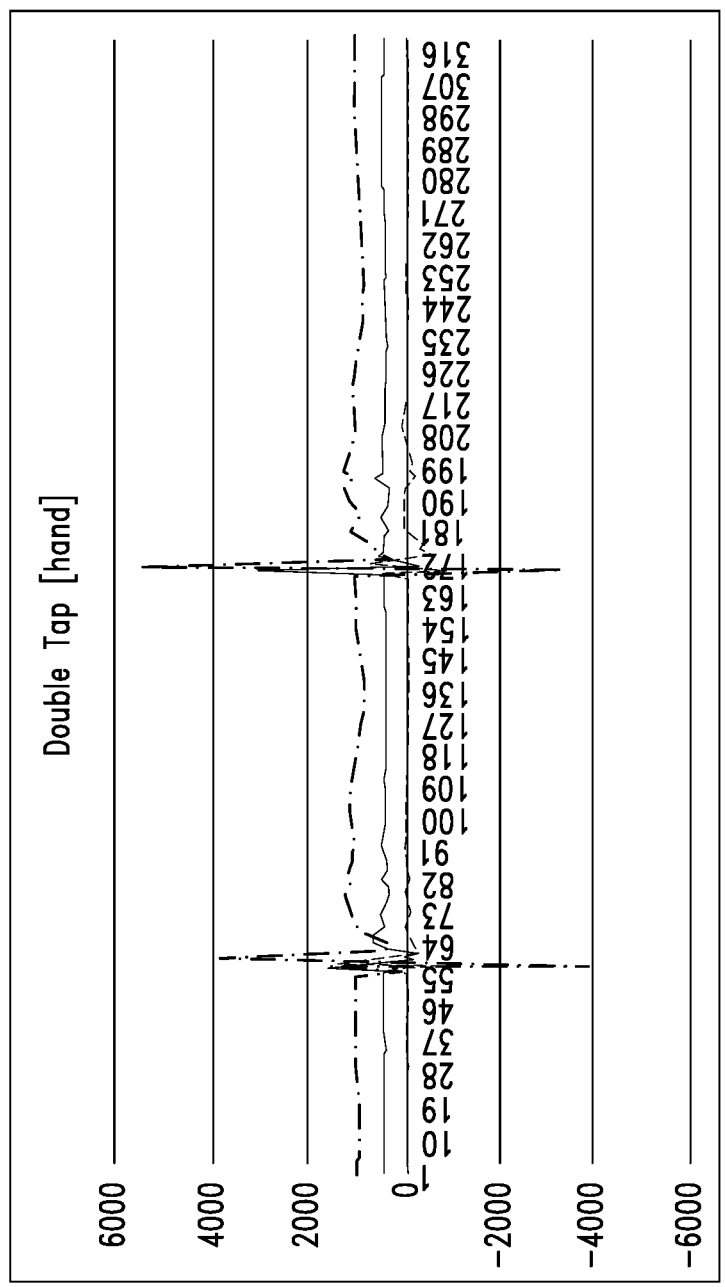
FIG. 5 illustrates an example of accelerometer data associated with a double-tap of a device in a hand-held carry position.

For example, FIG. 4 illustrates example accelerometer data associated with a double-tap on a device resting on a hard surface, such as a table. FIG. 5 illustrates example accelerometer data associated with a double tap on a device in a hand-carried position. As can been seen, a typical magnitude of an accelerometer signal associated with a tap when a device is on a hard surface is substantially smaller than a typical signal for a device in a hand-carried position. Thus, if the parameters (e.g., threshold magnitudes) associated with a device resting on a hard surface were used in response to a determination at 306 that a device is in a hand-carried position (e.g., when using a single detection logic), many false positives would be detected. Similarly, if parameter settings were selected which avoided false positives for a device in a hand-carried position, many double taps would be missed if the device were instead resting on a hard surface. Selecting parameters based on a determined carry position facilitates avoiding both false positives and missed double-taps, and, in a test of an embodiment, significantly improved the reliability of a double-tap detection circuit.

For example, in an embodiment, in response to a determination at 306 that a device is resting on a hard surface, a magnitude parameter associated with data of a first axis (e.g., an Z-axis) might be set at 1.3 g, a magnitude parameter associated with a second axis (e.g., a Y-axis) may be set at −1.3 g, a magnitude parameter associated with a third axis (e.g., an x-axis) may be set at −1.1 g, and a time window parameter may be set at 150 ms. Other parameter settings may be employed (e.g., different magnitudes, window sizes, logic-selection parameters, etc.). In an embodiment, fewer or more parameters may be set in response to a determination at 306 that a device is resting on a hard surface. For example, a magnitude parameter associated with only one axis (e.g., the z-axis) may be set when the double-tap detection algorithm employed at 310 is based on the magnitude of a single axis, some embodiments may use a single detection logic, so a logic-selection parameter may not be employed in some embodiments. Multiple parameters may be set for a single axis, for example, a first magnitude parameter may be set for a first tap and a second magnitude parameter may be set for a second tap with in a threshold time window.

In response to a determination at 306 that the device is in a hand-carried position, a magnitude parameter associated with data of a first axis (e.g., an Z-axis) might be set at 3.7 g, a magnitude parameter associated with a second axis (e.g., a Y-axis) may be set at 1.7 g, a magnitude parameter associated with a third axis (e.g., an x-axis) may be set at 0.3 g, and a time window parameter may be set at 200 ms. Other parameter settings may be employed (e.g., different magnitudes, window sizes, etc.). In an embodiment, fewer parameters may be set in response to a determination at 306 that a device is in a hand-carried position. For example, a magnitude parameter associated with only one axis (e.g., the z-axis) may be set when the double-tap detection algorithm employed at 310 is based on the magnitude of a single axis. The method proceeds from 308 to 310.

At 310, the method 300 monitors accelerometer data to detect double-taps using the parameters selected at 308. For example, a double-tap detection routine or logic may be executed which compares accelerometer data (e.g., raw data, filtered data, etc.) associated with one or more axis to one or more thresholds set based on the selected parameters (e.g., set to a selected threshold parameter). A tap may be detected if a received magnitude exceeds an associated threshold. In an embodiment, the method proceeds to 312 after a time window has expired. At 312, if two taps were detected within the time window, a double-tap may be detected at 312. The time window may be fixed or may be set based on a parameter setting associated with a determined carry position.

In response to a determination at 312 that a double tap was detected, the method proceeds from 312 to 314, where a flag is set to indicate detection of a double tap. Various control signals may be generated in response to the setting of the flag, such as control signals to wake a device, to activate an application, etc. In response to a determination at 312 that a double tap was not detected, the method proceeds from 312 to 304, where the method receives or samples a next set of accelerometer data.

Embodiments of methods of detecting a double-tap may contain additional acts not shown in FIG. 3, may not contain all of the acts shown in FIG. 3, may perform acts shown in FIG. 3 in various orders, and may be modified in various respects. For example, acts 310 and 312 may be combined in some embodiments and a sliding window may be used within a longer monitoring period. In another example, machine learning techniques may be employed to adjust the parameter settings associated with one or more determined carry-positions. In another example, various acts may be performed in parallel. For example, raw accelerometer data may be monitored to detect changes in carry-position while filtered accelerometer data is monitored to detect double-taps. In another example, the method 300 may determine whether the method 300 is done, for example, in response to a command from the processor core to stop detection of double-taps.

A pair of ST LSM6DSO™ programmable sensors were employed to implement an example embodiment of the double-tap detection circuit 200 of FIG. 2. In a test of the example embodiment, when the decision tree 222 and the parameter setting circuit 234 were omitted or disabled, false double-taps were detected in a data stream with the device in a hand-held position. When the decision tree 222 and the parameter setting circuit 234 were enabled, no false positives were detected and all double taps were detected.

Some embodiments may take the form of or comprise computer program products. For example, according to one embodiment there is provided a computer readable medium comprising a computer program adapted to perform one or more of the methods or functions described above. The medium may be a physical storage medium, such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some or all of the methods and/or functionality may be implemented or provided in other manners, such as at least partially in firmware and/or hardware, including, but not limited to, one or more application-specific integrated circuits (ASICs), digital signal processors, discrete circuitry, logic gates, standard integrated circuits, controllers (e.g., by executing appropriate instructions, and including microcontrollers and/or embedded controllers), field-programmable gate arrays (FPGAs), complex programmable logic devices (CPLDs), etc., as well as devices that employ RFID technology, and various combinations thereof.

The various embodiments described above can be combined to provide further embodiments. Aspects of the embodiments can be modified, if necessary to employ concepts of the various embodiments and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A device, comprising:
digital signal processing circuitry, which, in operation, determines a device-carry-position of a plurality of device-carry positions based on accelerometer data;
sets one or more double-tap detection parameters based on the determined device-carry-position;
detects double-taps based on double-tap detection logic, wherein the double-tap detection logic uses at least one of the one or more double-tap detection parameters set based on the determined device-carry-position to detect double-taps; and
generates a control signal in response to detection of a double tap; and
an interface coupled to the digital signal processing circuitry, which, in operation, transmits the control signal, wherein the plurality of device-carry-positions include a first position indicating resting on a hard surface and a second position indicating hand-held.

2. The device of claim 1, comprising:
an accelerometer, which, in operation, generates the accelerometer data.

3. The device of claim 2 wherein the accelerometer is a three-axis accelerometer which, in operation, outputs an acceleration signal of each axis.

4. The device of claim 1, comprising:
a high-pass filter, which, in operation, filters the accelerometer data.

5. The device of claim 4 wherein the double-tap detection logic uses the filtered accelerometer data.

6. The device of claim 1 wherein the one or more double-tap detection parameters comprise one or more threshold magnitudes.

7. The device of claim 6 wherein the double-tap detection logic compares accelerometer data to the one or more threshold magnitudes.

8. The device of claim 1 wherein the one or more double-tap detection parameters comprise one or more magnitude ranges.

9. The device of claim 1 wherein the one or more double-tap detection parameters comprise one or more window sizes.

10. The device of claim 1 wherein the control signal comprises a flag.

11. The device of claim 1 wherein the control signal comprises an interrupt.

12. The device of claim 1 wherein the double-tap detection logic is fixed.

13. A system, comprising:
one or more processing cores, which in operation, process digital data; and
a sensor, communicatively coupled to the one or more processing cores, the sensor including:
an accelerometer, which, in operation, generates accelerometer data; and
digital signal processing circuitry communicatively coupled to the accelerometer, wherein the digital signal processing circuitry, in operation:
determines a device-carry-position of a plurality of device-carry-positions based on the accelerometer data;
sets one or more double-tap detection parameters based on the determined device-carry-position;
detects double-taps based on double-tap detection logic, wherein the double-tap detection logic uses at least one of the one or more double-tap detection parameters set based on the determined device-carry-position to detect double-taps; and
generates a control signal in response to detection of a double tap, wherein the plurality of device-carry-positions include a first position indicating resting on a hard surface and a second position indicating hand-held.

14. The system of claim 13 wherein the accelerometer is a three-axis accelerometer which, in operation, outputs an acceleration signal of each axis.

15. The system of claim 13 wherein the digital signal processing circuitry comprises a high-pass filter.

16. The system of claim 13 wherein the control signal is an interrupt signal and the one or more processing cores, in operation, respond to the interrupt signal by initiating execution of an application.

17. The system of claim 13 wherein the one or more double-tap detection parameters comprise one or more threshold magnitudes.

18. The system of claim 17 wherein the double-tap detection logic compares accelerometer data to the one or more threshold magnitudes.

19. The system of claim 18 wherein the one or more double-tap detection parameters comprise one or more window sizes.

20. The system of claim 13 wherein the plurality of device-carry-positions include a third position indicating resting on a soft surface.

21. A method, comprising:
determining, using digital signal processing circuitry, a device-carry-position of a plurality of device-carry-positions based on accelerometer data;
setting, using the digital signal processing circuitry, one or more double-tap detection parameters based on the determined device-carry-position;
detecting, using the digital signal processing circuitry, double-taps based on double-tap detection logic, wherein the double-tap detection logic uses at least one of the one or more double-tap detection parameters set based on the determined device-carry position to detect double-taps; and generating, using the digital signal processing circuitry, a control signal in response to detection of a double tap, wherein the plurality of device-carry-positions include a first position indicating resting on a hard surface and a second position indicating hand-held.

22. The method of claim 21 wherein the one or more double-tap detection parameters comprise one or more threshold magnitudes.

23. The method of claim 22 wherein the double-tap detection logic compares accelerometer data to the one or more threshold magnitudes.

24. A non-transitory computer-readable medium having contents which cause digital signal processing circuitry to perform a method, the method comprising:
  determining a device-carry-position of a plurality of device-carry-positions based on accelerometer data;
  setting one or more double-tap detection parameters based on the determined device-carry-position;
  executing a detecting double-tap detection routine, wherein the double-tap detection routine uses at least one of the one or more double-tap detection parameters set based on the determined device-carry-position to detect double-taps; and
  generating a control signal in response to detection of a double tap wherein the plurality of device-carry-positions include a first position indicating resting on a hard surface, a second position indicating hand-held, and a third position indicating resting on a soft surface.

25. The non-transitory computer-readable medium of claim 24 wherein the contents comprise instruction which, when executed by the digital signal processing circuitry, cause the digital signal processing circuitry to perform the method.

26. The non-transitory computer-readable medium of claim 24 wherein the one or more double-tap detection parameters comprise one or more threshold magnitudes which are different for different determined positions.

27. The method of claim 21 wherein the plurality of device-carry-positions include a third position indicating resting on a soft surface.

28. The device of claim 1 wherein the plurality of device-carry-positions include a third position indicating resting on a soft surface.

29. The device of claim 1 wherein the digital signal processing circuitry, in operation, determines additional position information.

30. The device of claim 29 wherein the additional position information includes an indication of whether the device is traveling.

31. The method of claim 21, comprising determining whether the device is traveling.

* * * * *